US012482986B2

(12) United States Patent
Myer et al.

(10) Patent No.: US 12,482,986 B2
(45) Date of Patent: Nov. 25, 2025

(54) INTEGRALLY MOLDED POWER CONNECTOR HOUSING HAVING AN INSERT HELD BY A BREAKABLE BRIDGE

(71) Applicant: TE Connectivity Solutions GmbH, Schaffhausen (CH)

(72) Inventors: John M. Myer, Middletown, PA (US); Daniel W. Fry, Jr., Middletown, PA (US); Hurley Chester Moll, Hershey, PA (US); Joel H. Barnett, Winston Salem, NC (US)

(73) Assignee: TE Connectivity Solutions GmbH (CH)

( * ) Notice: Subject to any disclaimer, the term of this patent is extended or adjusted under 35 U.S.C. 154(b) by 372 days.

(21) Appl. No.: 18/172,233

(22) Filed: Feb. 21, 2023

(65) Prior Publication Data

US 2024/0283196 A1 Aug. 22, 2024

(51) Int. Cl.
*H01R 13/629* (2006.01)
*H01H 9/20* (2006.01)

(52) U.S. Cl.
CPC ......... *H01R 13/62938* (2013.01); *H01H 9/20* (2013.01)

(58) Field of Classification Search
CPC .............. H01R 2201/26; H01R 13/501; H01R 13/502; H01R 13/506; H01R 13/514
See application file for complete search history.

(56) References Cited

U.S. PATENT DOCUMENTS

| | | | | |
|---|---|---|---|---|
| 5,083,933 | A * | 1/1992 | Colleran | H01R 13/6272 439/271 |
| 6,666,698 | B2 * | 12/2003 | Beck, Jr. | H01R 13/641 439/157 |
| 8,430,689 | B2 | 4/2013 | Myer et al. | |
| 8,808,033 | B2 * | 8/2014 | White | H01R 13/6215 439/364 |
| 8,956,170 | B2 * | 2/2015 | White | H01R 13/405 439/252 |
| 10,128,606 | B2 * | 11/2018 | Suzuki | H05K 5/064 |
| 10,128,624 | B2 * | 11/2018 | Tyler | H01R 13/62938 |
| 10,141,669 | B2 * | 11/2018 | Tyler | H01R 13/04 |
| 11,336,051 | B1 * | 5/2022 | Tyler | H01R 13/5202 |

* cited by examiner

*Primary Examiner* — Vanessa Girardi

(57) ABSTRACT

A power connector includes a housing including a terminal carrier and an insert matable to the terminal carrier. The terminal carrier includes terminal channels holding power terminals. The terminal carrier includes a pocket aligned with carrier openings. The insert is coupled to the terminal carrier at the pocket and configured to be received in the pocket. The insert includes insert openings therethrough configured to be aligned with the carrier openings when the insert is received in the pocket. The terminal carrier and the insert are molded as a single piece with a bridge connecting the terminal carrier and the insert. The bridge is breakable prior to or during assembly to allow loading of the insert into the pocket and coupling of the insert to the terminal carrier.

20 Claims, 4 Drawing Sheets

INTEGRALLY MOLDED POWER CONNECTOR HOUSING HAVING AN INSERT HELD BY A BREAKABLE BRIDGE

BACKGROUND OF THE INVENTION

The subject matter herein relates generally to electrical connectors.

Electrical connectors typically include a housing holding terminals or contacts that are configured to be mated with another electrical connector. The housing of the electrical connector is typically provided with cavities extending therethrough for receiving the terminals. The cavities are provided with resilient locking latches integrally molded with the housing for locking terminals inserted therein. In order to mold the latches and other complicated features into the housing that secure the terminals in the terminal cavities, the electrical connectors are typically manufactured from two housings or shells that are coupled together. Assembly requires picking up both housing pieces, aligning them and mating them together. Such assembly is labor intensive and time consuming. Additionally, both parts are typically molded in separate molds, thereby doubling the manufacturing time for the housing. Additionally, large plastic molded parts and parts with thick sections require longer cooling times before the parts can be ejected from the mold tooling, which increases mold cycle time and increases manufacturing costs. The cycle time of the molded part is affected by the wall thicknesses. The cycle time of the molded part is affected by small and/or long cores through the part, which build up heat and lengthen cooling time.

A need remains for a method of reducing cooling time for the molding cycle of housing parts for an electrical connector.

BRIEF DESCRIPTION OF THE INVENTION

In one embodiment, a power connector is provided and includes a housing including a terminal carrier and an insert matable to the terminal carrier to define the housing. The terminal carrier includes terminal channels holding power terminals. The terminal carrier includes carrier openings extending therethrough. The terminal carrier includes a pocket. The pocket is aligned with the carrier openings. The insert is coupled to the terminal carrier at the pocket. The insert configured to be received in the pocket. The insert includes insert openings therethrough configured to be aligned with the carrier openings when the insert is received in the pocket. The terminal carrier and the insert are molded as a single piece with a bridge connecting the terminal carrier and the insert. The bridge configured to be breakable prior to or during assembly to allow loading of the insert into the pocket and coupling of the insert to the terminal carrier.

In another embodiment, a power connector is provided and includes a housing including a terminal carrier and an insert matable to the terminal carrier to define the housing. The terminal carrier has a front, a rear, a top, a bottom, and opposite sides. The terminal carrier has terminal channels extending between the front and the rear. The terminal channels are configured to receive corresponding power terminals therein. The terminal carrier includes a pocket. The pocket is open at the top. The terminal carrier includes carrier openings extending therethrough. The pocket is aligned with the carrier openings. The insert has a front, a rear, a top, a bottom, and opposite sides. The insert configured to be received in the pocket. The insert includes insert openings therethrough configured to be aligned with the carrier openings when the insert is received in the pocket. The terminal carrier and the insert are molded as a single piece with a bridge formed between the top of the terminal carrier and the bottom of the insert connecting the terminal carrier and the insert. The bridge configured to be breakable prior to or during assembly to allow loading of the insert into the pocket and coupling of the insert to the terminal carrier.

In a further embodiment, a power connector is provided and includes a housing including a terminal carrier and an insert matable to the terminal carrier to define the housing. The terminal carrier includes terminal channels at a mating end of the terminal carrier configured to be mated to a header connector. The terminal carrier includes HVIL contact channels. The terminal carrier includes a pocket aligned with the HVIL contact channels. The insert is coupled to the terminal carrier at the pocket. The insert is configured to be received in the pocket. The insert includes HVIL contact channels. The terminal carrier and the insert are molded as a single piece with a bridge connecting the terminal carrier and the insert. The bridge configured to be breakable prior to or during assembly to allow loading of the insert into the pocket to a loaded position. The HVIL contact channels of the insert are aligned with the HVIL contact channels of the terminal carrier in the loaded position. The power connector includes power terminals received in the terminal channels of the terminal carrier. The power terminals configured to be coupled to header power terminals of the header connector to form a power circuit. The power connector includes HVIL contacts received in the HVIL contact channels of the terminal carrier and the insert. The HVIL contacts configured to be mated with header HVIL contacts of the header connector to form a HVIL circuit. The HVIL circuit controlling the power circuit.

DETAILED DESCRIPTION OF THE INVENTION

Figure 1:
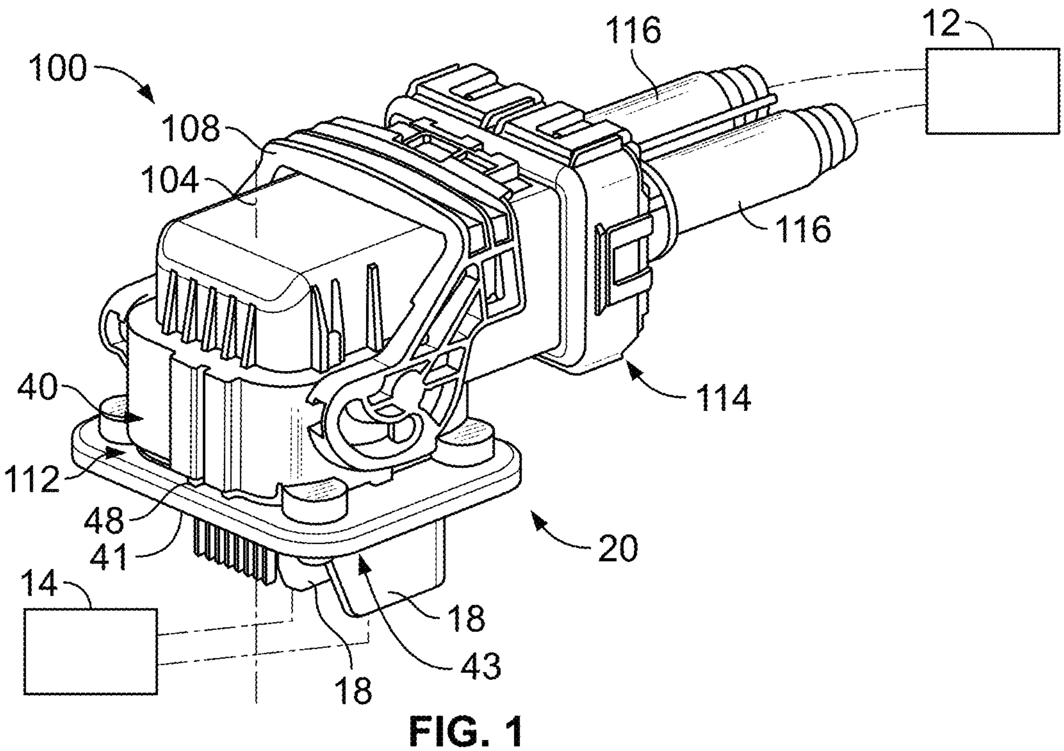
FIG. 1 is a perspective view of a power connector system in an assembled and mated state.
Figure 2:
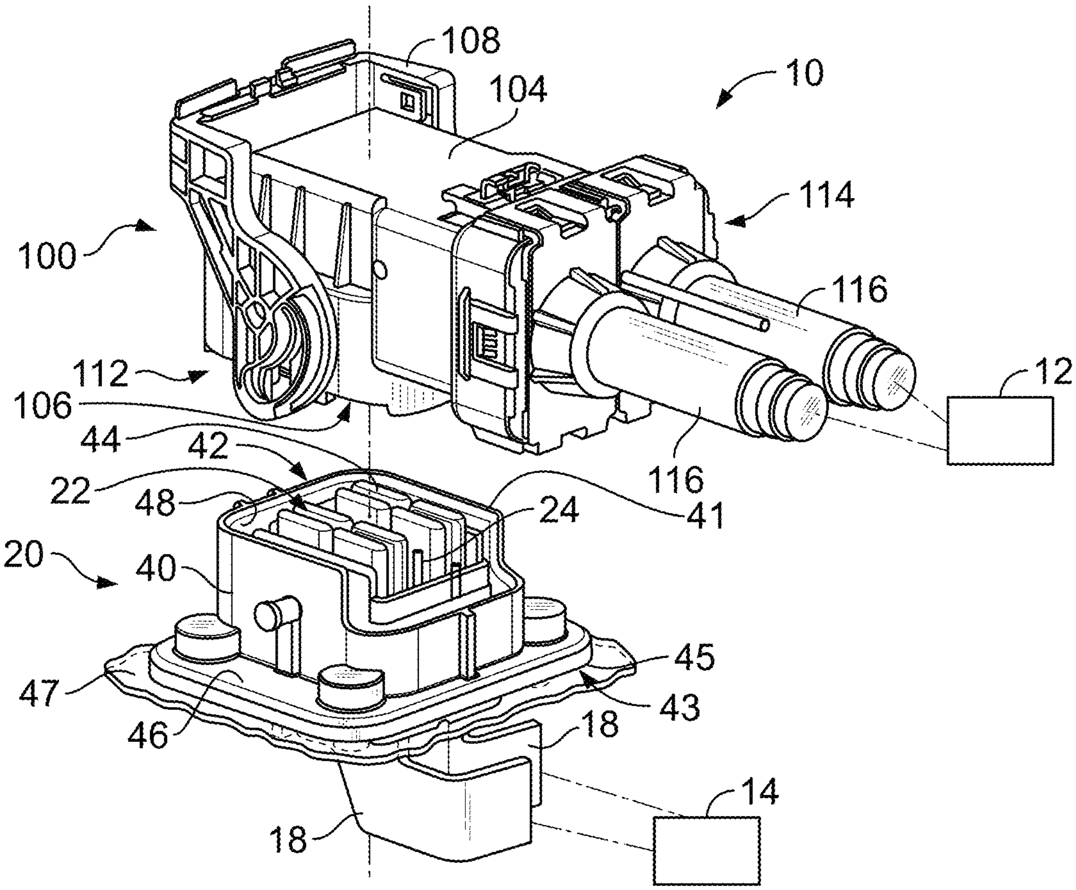
FIG. 2 is a perspective view of the power connector system shown in FIG. 1 in an unmated state.

FIG. 1 is a perspective view of a power connector system 10 formed in accordance with an exemplary embodiment in an assembled and mated state. FIG. 2 is a perspective view of the power connector system 10 in an unmated state. The power connector system 10 includes a header connector 20 and a power connector 100 configured to be mated with the header connector 20. In an exemplary embodiment, the power connector system 10 is a high-power connector system that is used to transfer power between various components as part of a high power circuit. In a particular application, the power connector system 10 is a battery system, such as a battery system of a vehicle, such as an electric vehicle or hybrid electric vehicle; however, the power connector system 10 is not intended to be limited to such battery systems.

The power connector 100 is configured to be electrically connected to a component 12, such as through one or more power cables 116; however, the power connector 100 may be electrically connected to the component 12 by other means, such as a terminal, a bus bar or other connector. In various embodiments, the component 12 may be a battery, a charger, an inverter, an electric motor or another type of component. The header connector 20 is configured to be electrically connected to a component 14, such as through a power bus bar 18; however, the header connector 20 may be electrically connected to the component 14 by other means, such as a terminal, power wire or other connector. In various embodiments, the header connector 20 may be electrically connected to a battery pack, such as through a battery distribution unit, a manual service disconnect, a charger, an inverter, an electric motor, or another type of component. The battery distribution unit may manage the power capacity and functionality of the power connector system 10, such as by measuring current and regulating power distribution of the battery pack.

In the illustrated embodiment, the power connector system 10 is a right angle connector system where the connectors 20, 100 are mated in a direction perpendicular to the power wires. Other mating orientations are possible in alternative embodiments, such as a vertical direction where the cables 116 are parallel to the mating direction rather than perpendicular to the mating direction. Optionally, the power connector 100 may be removably coupled to the header connector 20 to disconnect the high power circuit of one or more of the components, such as the battery pack, the electric motor, the inverter, or other components of the vehicle, such as for maintenance, repair or for another reason. When mated, one or more header terminals 22 (FIG. 2) of the header connector 20 are mated with corresponding power terminals 110 (shown in FIG. 3) of the power connector 100, such as at mating interfaces thereof. In the illustrated embodiment, the header connector 20 includes a pair of the header terminals 22. However, greater or fewer header terminals 22 may be utilized in alternative embodiments. Having multiple terminals increases the current carrying capacity of the system 10. Optionally, each power terminal 110 may be terminated to a corresponding power cable 116.

In an exemplary embodiment, the header connector 20 and/or the power connector 100 may include a high voltage interlock (HVIL) circuit to control the high voltage power circuit during opening and closing or mating and unmating of the connectors 20, 100. For example, both connectors 20, 100 may include corresponding HVIL contacts that, when mated, form an HVIL circuit used to control the high voltage power circuit (for example, open/close the high voltage power circuit). The HVIL circuit may be electrically connected to the component 14 and/or the component 12. In an exemplary embodiment, the header connector 20 includes one or more HVIL contacts 24, such as a pair of the HVIL contacts 24. The HVIL contacts 24 may be centered between the pair of header terminals 22.

In an exemplary embodiment, the power connector 100 utilizes a lever 108 to unmate and/or mate the connectors 20, 100, which may open/close the high voltage circuit and the HVIL circuit during unmating/mating of the connectors 20, 100. The HVIL circuit may be opened first during unmating to shut off the high voltage circuit prior to opening or unmating of the terminals 110, 22, which may reduce the likelihood of damage, such as from arcing. In an exemplary embodiment, the high voltage conducting surfaces of the connectors 20, 100 are finger proof and touch-safe.

The header connector 20 includes a header housing 40 having a mating end 42 and a mounting end 43. In the illustrated embodiment, the mating end 42 is opposite the mounting end 43, such as with the mating end 42 at a top 41 of the header housing 40 and the mounting end 43 at a bottom 45 of the header housing 40. Other orientations are possible in alternative embodiments, such as located at front and/or rear and/or sides of the header housing 40.

The header housing 40 holds one or more of the header terminals 22. Optionally, the header terminals 22 may be fork terminals having sockets defined by spring beams on both sides of the sockets to mate with both sides of the power terminal 110; however, other types of header terminals may be used in alternative embodiments. The header terminals 22 may be shrouded to protect the header terminals 22. For example, the header terminals 22 may have covers or touch guards 44 such that the header terminals 22 are touch-safe.

The header housing 40 includes a flange 46 at the mounting end 43 for mounting the header housing 40 to a supporting structure 47, such as a chassis, a panel, a wall, a mounting bracket or another component of the vehicle. Optionally, the header connector 20 may be electrically grounded to the supporting structure 47. In an exemplary embodiment, the header connector 20 includes a header seal (not shown) at the mounting end 43 configured to be sealed against the supporting structure 47. Optionally, the header housing 40 may be mounted horizontally; however, other orientations are possible in alternative embodiments.

In an exemplary embodiment, the header housing 40 includes guide features 48 for guiding mating of the power connector 100 with the header connector 20. For example, the guide features 48 may be ribs, posts, slots, keying features or other types of guide features.

The power connector 100 includes a housing 102 and an outer shell 104 surrounding the housing 102. The outer shell 104 includes a shell cavity 106. The housing 102 is received in the shell cavity 106 of the outer shell 104. The lever 108 is coupled to the outer shell 104. The housing 102 holds the power terminals 110. In an exemplary embodiment, the power connector 100 extends between a mating end 112 and a cable end 114. The power cables 116 extend from the cable end 114. The mating end 112 is configured to be mated to the mating end 42 of the header housing 40. In various embodiments, the plug connector includes a sealing wall at the mating end 112 configured to interface with the header seal within the interior of the header housing 40 to form a sealed connection between the power connector 100 and the header connector 20. In an exemplary embodiment, the housing 102 is a right-angle housing holding the power cables 116 perpendicular to a mating direction along a mating axis. Other orientations are possible in alternative embodiments.

In an exemplary embodiment, the lever 108 is rotatably coupled to the housing 102. The lever 108 is configured to engage the header housing 40, such as corresponding guide features 48, to secure the power connector 100 to the header connector 20. Optionally, the lever 108 may include a slot that receives corresponding guide features 48 to control mating and unmating of the power connector 100 to the header connector 20. For example, as the lever 108 is rotated closed, the housing 102 may be pulled down onto the header housing 40. Conversely, as the lever 108 is raised, the housing 102 may be pressed away from and unmated from the header housing 40. The high power circuit and the HVIL circuit of the power connector system 10 may be opened and closed as the power connector 100 is unmated from and mated to the header connector 20.

Figure 3:
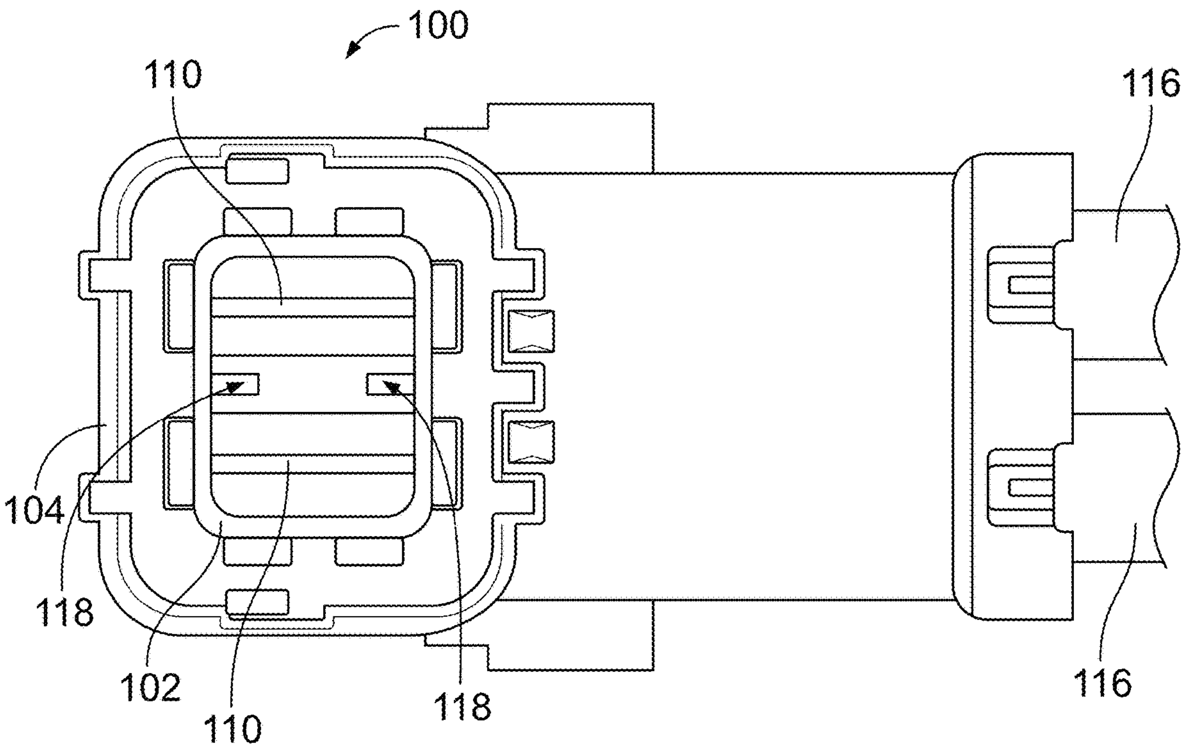
FIG. 3 is a bottom view of a portion of a power connector of the power connector system in accordance with an exemplary embodiment.

FIG. 3 is a bottom view of the power connector 100 in accordance with an exemplary embodiment. The power connector 100 includes the housing 102 and the outer shell 104 surrounding the housing 102. The housing 102 holds the power terminals 110, which are connected to the power cables 116. In an exemplary embodiment, the power terminals 110 are blade type terminals; however, other types of terminals may be used in alternative embodiments, such as sockets, pins, spring beams, and the like. In an exemplary embodiment, the power connector 100 includes one or more HVIL contacts 118, such as a pair of the HVIL contacts 118. The HVIL contacts 118 may be centered between the pair of power terminals 110. The HVIL contacts 118 may be pin contacts; however, other types of terminals may be used in alternative embodiments, such as sockets, blades, spring beams, and the like.

Figure 4:
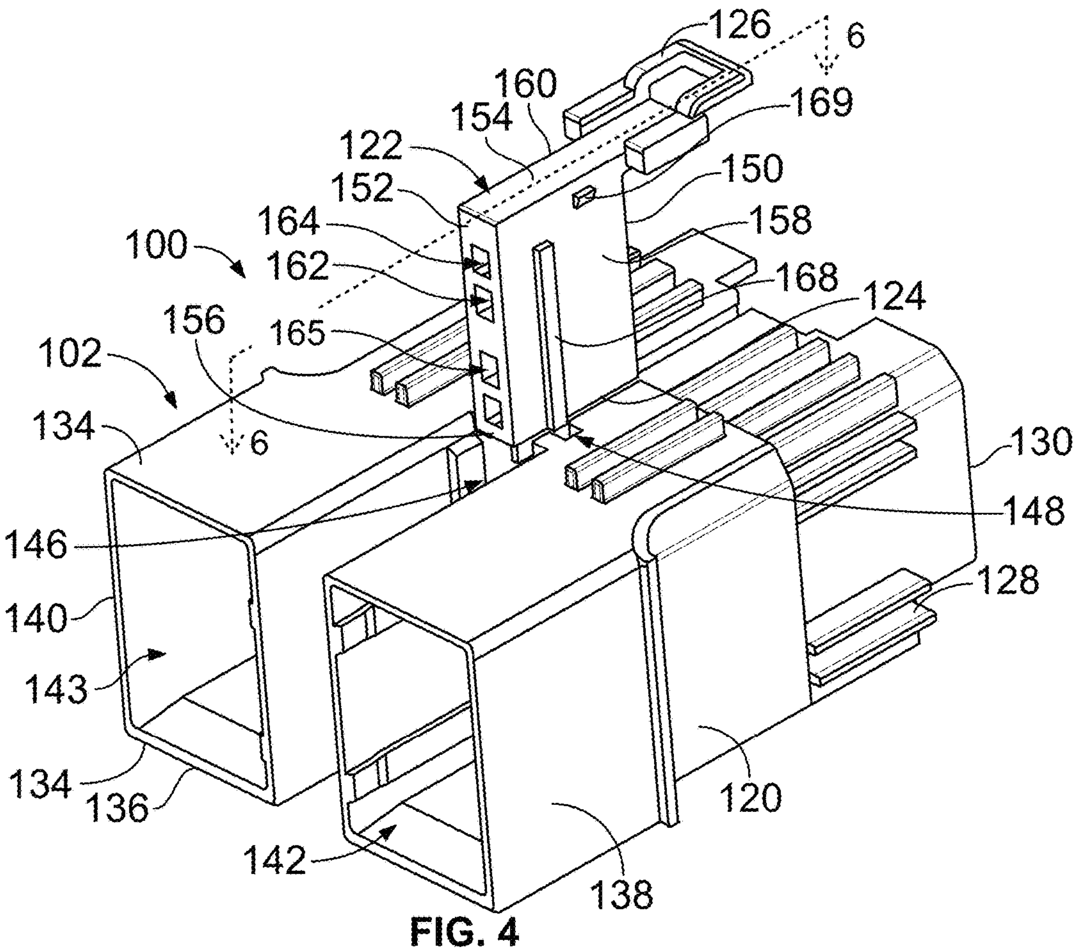
FIG. 4 a rear perspective of a housing of a power connector of the power connector system in accordance with another embodiment showing the housing in a pre-assembled state.
Figure 5:
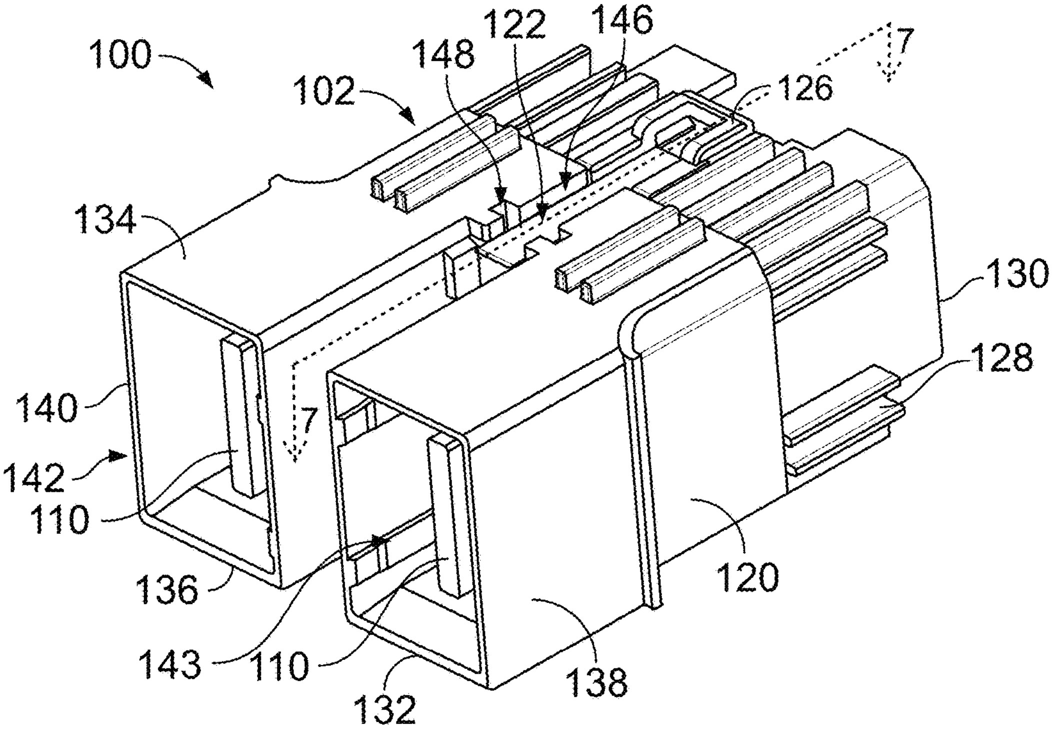
FIG. 5 a rear perspective of the housing of the power connector shown in FIG. 4 showing the housing in an assembled state with power terminals therein.

FIG. 4 a rear perspective of the housing 102 of the power connector 100 in accordance with an exemplary embodiment showing the housing 102 in a pre-assembled state. FIG. 5 a rear perspective of the housing 102 of the power connector 100 in accordance with an exemplary embodiment showing the housing 102 in an assembled state.

The housing 102 includes a terminal carrier 120 and an insert 122 matable to the terminal carrier 120 to define the housing 102. In an exemplary embodiment, the insert 122 is co-molded with the terminal carrier 120 as a single molded structure, wherein both the terminal carrier 120 and the insert 122 are molded during a single molding process. Molding the terminal carrier 120 and the insert 122 together in a single molding process reduces manufacturing cost. Molding the insert 122 in an extended position (FIG. 4) improves and reduces cooling, which increases throughput and reduces manufacture time. The housing 102 represents a robust, low cost, compact design. Furthermore, the configuration and arrangement of the housing 102 enables use of simplified design and manufacturing processes, increasing turnover and lowering cost without adversely impacting quality and reliability.

The terminal carrier 120 is configured to hold a plurality of the power terminals 110 (FIG. 5) that are configured to be mated with corresponding header terminals 22 (shown in FIG. 2). The terminal carrier 120 is configured to hold the HVIL contacts 118 (shown in FIG. 3). The insert 122 may surround portions of the HVIL contacts 118, such as the wires. In various embodiments, the insert 122 may be used to guide the HVIL contacts 118 into the terminal carrier 120.

A housing latch 126 is used to secure the power connector 100 to the outer shell 104 (FIG. 3). In the illustrated embodiment, the housing latch 126 extends from the insert 122. Alternatively, the housing latch 126 may extend from the terminal carrier 120.

The housing 102 includes alignment features 128 that are used to align the power connector 100 with respect to the header connector 20 during mating. Optionally, the alignment features 128 may constitute keying features, wherein the housing 102 may be mated with the header connector 20 in a single orientation, defined by the alignment features 128. The alignment features 128 may be ribs or protrusions. The alignment features 128 may extend from the terminal carrier 120 and/or the insert 122.

In an exemplary embodiment, when the housing 102 is manufactured, the terminal carrier 120 and the insert 122 are molded as a single piece with the bridge 124 connecting the terminal carrier 120 and the insert 122. The bridge 124 may be flashing that occurs during the molding operation. The bridge 124 may be a living hinge in other various embodiments. The bridge 124 may be sized (e.g. have a length/width/thickness) and positioned to be breakable to separate the terminal carrier 120 and the insert 122 to allow assembly. At some time after molding, the bridge 124 is broken to separate the insert 122 from the terminal carrier 120. For example, in an exemplary embodiment, the housing 102 is manufactured in such a way that the insert 122 is aligned for mating with the terminal carrier 120, whereby the insert 122 may be pressed straight into the terminal carrier 120 in a loading direction, such as in the direction of arrow A. The insert 122 may be snapped or clipped into the terminal carrier 120 to retain the insert 122 in the terminal carrier 120.

The bridge 124 is broken during loading of the insert 122 into the terminal carrier 120. The bridge 124 may be broken by applying pressure to the terminal carrier 120 and/or the insert 122. In an alternative embodiment, after manufacture of the housing 102, the terminal carrier 120 and the insert 122 may be separated from one another by breaking the bridge 124. Having the terminal carrier 120 and the insert 122 co-molded at the same time using the same mold allows a greater volume of housings 102 to be manufactured.

The terminal carrier 120 is manufactured from a dielectric material. The terminal carrier 120 includes a front 130, a rear 132, a top 134, a bottom 136, a first side 138, and a second side 140. The terminal carrier 120 has a plurality of carrier openings 142 extending between the front 130 and the rear 132. In an exemplary embodiment, the carrier openings 142 include terminal channels 143. The terminal channels 143 are configured to receive corresponding power terminals 110 therein. The terminal carrier 120 may include terminal latches extending into the terminal channels 143. The terminal latches are configured to engage the corresponding terminals 110 to secure the power terminals 110 in the terminal channels 143. The carrier openings 142 may include other openings, such as contact channels 144 (FIG. 6) configured to receive the HVIL contacts 118.

In an exemplary embodiment, the terminal carrier 120 includes a pocket 146. The pocket 146 is configured to receive the insert 122. The insert 122 is aligned with the pocket 146 when molded and is configured to be pressed straight into the pocket 146. The bridges 124 are located at the pocket 146 to hold the insert 122 in alignment with (for example, directly above) the pocket 146. The pocket 146 may be open at the top 134 to receive the insert 122.

In an exemplary embodiment, the terminal carrier 120 includes guide features 148 that are used to guide mating of the terminal carrier 120 and the insert 122. In the illustrated embodiment, the guide features 148 are slots that are configured to be received within the insert 122. The guide features 148 may be dovetail slots in various embodiments. Optionally, the guide features 148 may be trapezoidal or other shaped features at both ends of the guide features.

The terminal carrier 120 includes securing features that are configured to interface with the insert 122 to securely couple the insert 122 to the terminal carrier 120. The securing features may be located in the pocket 146, such as in one or more of the walls forming the pocket 146. In an exemplary embodiment, the securing features may be pockets, openings, or grooves configured to receive complimentary securing features of the insert 122. In other embodiments, the securing features may be protrusions or latches extending into the pocket 146 to engage the insert 122.

The insert 122 is manufactured from a dielectric material. The insert 122 includes a front 150, a rear 152, a top 154, a bottom 156, a first side 158, and a second side 160. The insert 122 has a plurality of insert openings 162 extending between the front 150 and the rear 152. In an exemplary embodiment, the insert openings 162 include contact channels 164. The contact channels 164 are configured to receive corresponding HVIL contacts 118 therein. The insert 122 may include contact latches extending into the contact channels 164. The contact latches are configured to engage the corresponding HVIL contacts 118 to secure the HVIL contacts 118 in the contact channels 164. The insert openings 162 may include other openings, such as airflow openings 165 extending between the front 150 and the rear 152. The airflow openings 165 may reduce the amount of material, to reduce the cost of the insert 122. The airflow openings 165 allow airflow to enhance cooling of the insert 122 after molding, which reduces manufacturing time.

The insert 122 includes guide features 168 that are used to guide mating of the terminal carrier 120 and the insert 122. The guide features 168 interact with the guide features 148 to guide mating of the terminal carrier 120 and the insert 122. In the illustrated embodiment, the guide features 168 are ribs or protrusions configured to be received in the slots defining the guide features 148 of the terminal carrier 120. Other types of guide features may be used in alternative embodiments. In various embodiments, the guide features 168 may be dovetails, T-shaped ribs, or L-shaped ribs that are securely held in the guide slots of the terminal carrier 120.

The insert 122 includes securing features 169 that are configured to engage the terminal carrier 120 to securely couple the insert 122 to the terminal carrier 120. In an exemplary embodiment, the securing features 169 constitute interference ribs or catches configured to engage the terminal carrier 120 to secure the insert 122 to the terminal carrier 120. The securing features 169 may have other shapes or configurations in alternative embodiments. The securing features 169 may be located elsewhere in alternative embodiments.

In the illustrated embodiment, after manufacture (for example, molding) and prior to assembly, the bottom 156 of the insert 122 faces the top 134 of the terminal carrier 120. During assembly, the bottom 156 of the insert 122 is pressed into the pocket 146 of the terminal carrier 120. Optionally, when manufactured as a single piece, the bottom 156 of the insert 122 is substantially coplanar with the top 134 of the terminal carrier 120. The bridges 124 connect the bottom 156 of the insert 122 with the top 134 of the terminal carrier 120. The bridges 124 are located at the first and second sides 158, 160 of the insert 122. The bridges 124 may extend substantially the entire length of the insert 122 between the front 150 and the rear 152. In other various embodiments, multiple bridges 124 may be provided along each of the first side 158 and the second side 160. When mated (for example, when the insert 122 is loaded into the pocket 146), the insert 122 may substantially fill the pocket 146. The top 154 of the insert 122 may be generally flush with the top 134 of the terminal carrier 120. In other embodiments, the top 154 of the insert 122 may be recessed in the terminal carrier 120. In other embodiments, the top 154 of the insert 122 may be located above the top 134 of the terminal carrier 120.

Figure 6:
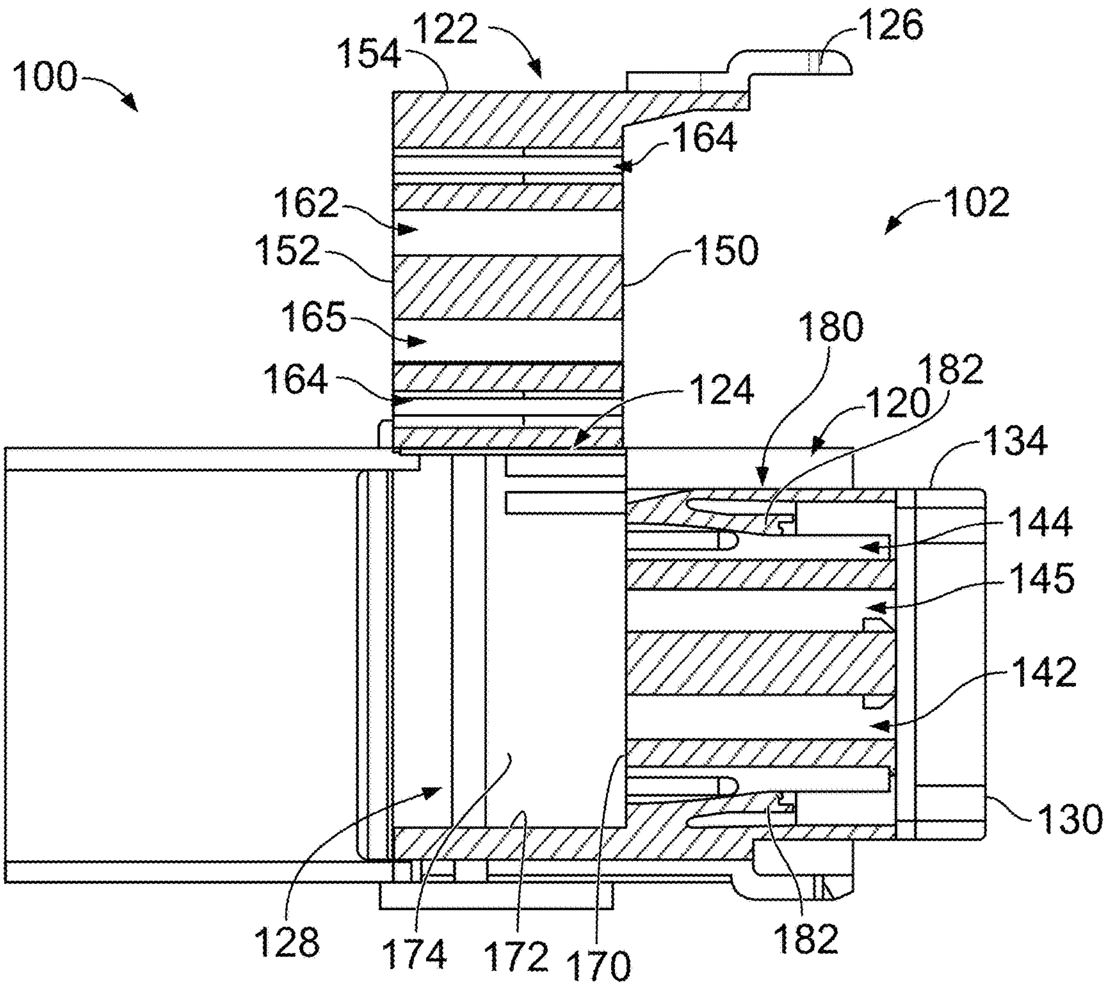
FIG. 6 is a cross-sectional view of the housing of the power connector showing the housing in a pre-assembled state corresponding to the housing shown in FIG. 4.
Figure 7:
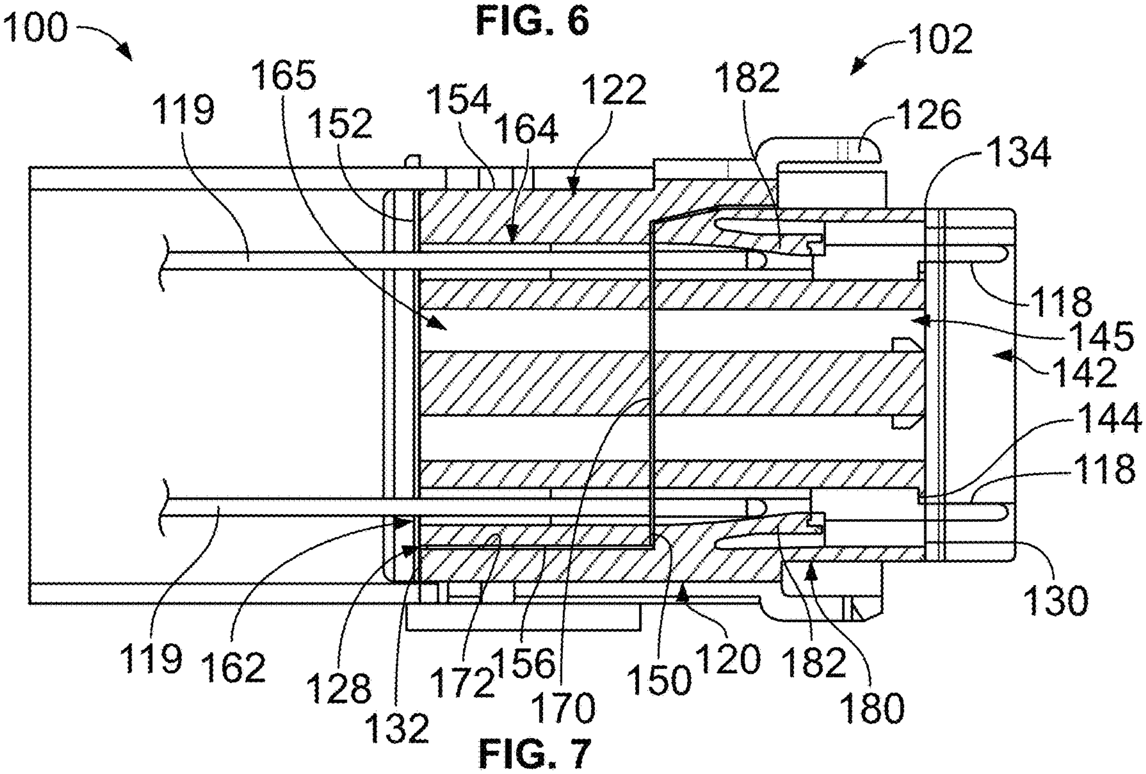
FIG. 7 a cross-sectional view of the housing of the power connector showing the housing in an assembled state corresponding to the housing shown in FIG. 5.

FIG. 6 is a cross-sectional view of the housing 102 of the power connector 100 in accordance with an exemplary embodiment showing the housing 102 in a pre-assembled state. FIG. 7 a cross-sectional view of the housing 102 of the power connector 100 in accordance with an exemplary embodiment showing the housing 102 in an assembled state. FIG. 7 illustrates contacts held in the housing 102, such as the HVIL contacts 118 held in the insert 122 and/or the terminal carrier 120.

The housing 102 includes the terminal carrier 120 and the insert 122. As described above, the housing 102 is molded as a single piece with the insert 122 held in an aligned position with respect to the terminal carrier 120 such that the terminal carrier 120 and the insert 122 may be assembled by simply pressing the terminal carrier 120 and the insert 122 together. During assembly, the insert 122 is pressed into the pocket 146 of the terminal carrier 120, thereby breaking the bridges 124 (FIG. 6) between the terminal carrier 120 and the insert 122.

The pocket 146 is defined by walls of the terminal carrier 120, such as a front pocket wall 170, a bottom pocket wall 172, and side pocket walls 174. Optionally, the rear of the pocket 146 may be open, such as to receive wires extending from the HVIL contacts 118. Optionally, the top of the pocket 146 may be open to receive the insert 122. The bridges 124 may extend across the top of the pocket 146, such as between the side pocket walls 174 and the bottom 156 of the insert 122.

The terminal carrier 120 includes a channel region 180 forward of the pocket 146. The channel region 180 is an interior region of the terminal carrier 120. The channel region 180 includes a plurality of the carrier openings 142, such as the contact channels 144 that receive contacts, such as the HVIL contacts 118. In an exemplary embodiment, the terminal carrier 120 includes contact latches 182 extending into the contact channels 144 to hold the HVIL contacts 118 in the contact channels 144. In an exemplary embodiment, the carrier openings 142 include other openings, such as airflow openings 145 extending between the front pocket wall 170 and the front 130 of the terminal carrier 120. The airflow openings 145 may reduce the amount of material, to reduce the cost of the terminal carrier 120. The airflow openings 145 allow airflow to enhance cooling of the channel region 180 of the terminal carrier 120 after molding, which reduces manufacturing time. The carrier openings 142 extend the entire length of the channel region 180, such as from the front pocket wall 170 to the front 130 of the terminal carrier 120. In an exemplary embodiment, molding the insert 122 separate from the channel region 180 (for example, co-molded during the same process but physically located separate from the channel region 180 by the bridges 124) shortens the lengths of the walls forming the carrier openings 142, which reduces the cooling time required to cool the terminal carrier 120, and thus reducing the overall manufacturing time. For example, the insert 122 may reduce the overall lengths of the walls by approximately half (for example, the width of the insert 122 is approximately equal to the width of the channel region 180).

During assembly, the insert 122 is separated from the terminal carrier 120 by breaking the bridges 124 and pressing the insert 122 into the pocket 146. The insert 122 includes a plurality of the insert openings 162 extending between the front 150 and the rear 152. In an exemplary embodiment, the insert openings 162 include the contact channels 164 that receive the HVIL contacts 118 and the airflow openings 165. When assembled, the contact channels 164 are configured to be aligned with the contact channels 144 in the terminal carrier 120. The HVIL contacts 118 may be loaded into the contact channels 144 through the contact channels 164. The wires 119 extend from the HVIL contacts

118 through the contact channels 164. When assembled, the airflow openings 165 are configured to be aligned with the airflow openings 145 in the terminal carrier 120.

The housing latch 126 extends from the insert 122, such as from the top 154. The housing latch 126 extends forward from the front 150 of the insert 122. The housing latch 126 extends along the top 134 of the terminal carrier 120 toward the front of the housing 102. The housing latch 126 is configured to be latchably coupled to the outer shell 104 to secure the housing 102 in the outer shell 104. The housing latch 126 may be deflectable to release the housing latch 126 from the outer shell 104. In other embodiments, the housing latch 126 may be latchably coupled to the header connector 20.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A power connector comprising:

a housing including a terminal carrier and an insert matable to the terminal carrier to define the housing;

the terminal carrier including terminal channels holding power terminals, the terminal carrier including carrier openings extending therethrough, the terminal carrier including a pocket, the pocket being aligned with the carrier openings;

the insert coupled to the terminal carrier at the pocket, the insert configured to be received in the pocket, the insert including insert openings therethrough configured to be aligned with the carrier openings when the insert is received in the pocket, wherein the terminal carrier and the insert are molded as a single piece with a bridge connecting the terminal carrier and the insert, the bridge configured to be breakable prior to or during assembly to allow loading of the insert into the pocket and coupling of the insert to the terminal carrier.

2. The power connector of claim 1, wherein the insert is loaded into the pocket in a loading direction, the loading direction being generally perpendicular to a mating direction for mating the power connector with a header connector.

3. The power connector of claim 1, wherein the bridge comprises flashing molded between the terminal carrier in the insert.

4. The power connector of claim 1, wherein the bridge is located at the pocket.

5. The power connector of claim 1, wherein the terminal carrier and the insert are molded with the insert being aligned for mating with the terminal carrier whereby the terminal carrier is configured to be pressed straight into the insert in a loading direction, the bridge being broken during loading of the terminal carrier into the insert.

6. The power connector of claim 1, wherein the carrier openings include high voltage interlock (HVIL) contact channels configured to receive HVIL contacts, the insert openings including HVIL contact channels configured to receive the HVIL contacts, the HVIL contact channels of the insert being aligned with the HVIL contact channels of the terminal carrier when the insert is loaded into the pocket.

7. The power connector of claim 1, wherein the terminal carrier includes a guide feature, the insert includes a guide feature aligned with, and engaging, the guide feature of the terminal carrier to guide mating of the insert and the terminal carrier, the bridge extending between the guide feature of the insert and the guide feature of the terminal carrier.

8. The power connector of claim 1, wherein the carrier openings have a first length, the insert openings having a second length approximately equal to the first length.

9. The power connector of claim 1, wherein the insert includes a securing latch, the power connector further comprising an outer shell having a shell cavity, the housing being received in the shell cavity, the outer shell surrounding the housing, the securing latch coupled to the outer shell to secure the housing in the shell cavity.

10. The power connector of claim 1, wherein the terminal channels include a first terminal channel and a second terminal channel, the pocket being positioned between the first terminal channel and the second terminal channel.

11. The power connector of claim 1, wherein the carrier openings include high voltage interlock (HVIL) contact channels configured to receive HVIL contacts, the insert openings including HVIL contact channels configured to receive the HVIL contacts, the HVIL contact channels of the insert being aligned with the HVIL contact channels of the terminal carrier when the insert is loaded into the pocket.

12. The power connector of claim 1, wherein the carrier openings include contact channels configured to receive electrical contacts, the insert openings including contact channels configured to receive the electrical contacts.

13. The power connector of claim 12, wherein the terminal carrier includes contact latches extending into the contact channels to latchably couple to the electrical contacts to retain the electrical contacts in the contact channels.

14. The power connector of claim 1, wherein the terminal carrier includes a front, a rear, a top, a bottom, a first side, and a second side, and wherein the insert includes a front, a rear, a top, a bottom, a first side, and a second side, the bridge extending between the top of the terminal carrier and the bottom of the insert.

15. The power connector of claim 14, wherein the bridge includes a first bridge member along the first side at the bottom of the insert and a second bridge member along the second side at the bottom of the insert.

16. A power connector comprising:

a housing including a terminal carrier and an insert matable to the terminal carrier to define the housing;

the terminal carrier having a front, a rear, a top, a bottom, and opposite sides, the terminal carrier having terminal channels extending between the front and the rear, the terminal channels being configured to receive corresponding power terminals therein, the terminal carrier including a pocket, the pocket being open at the top, the terminal carrier including carrier openings extending therethrough, the pocket being aligned with the carrier openings;

the insert having a front, a rear, a top, a bottom, and opposite sides, the insert configured to be received in the pocket, the insert including insert openings therethrough configured to be aligned with the carrier openings when the insert is received in the pocket, wherein the terminal carrier and the insert are molded as a single piece with a bridge formed between the top of the terminal carrier and the bottom of the insert connecting the terminal carrier and the insert, the bridge configured to be breakable prior to or during assembly to allow loading of the insert into the pocket and coupling of the insert to the terminal carrier.

17. The power connector of claim 16, wherein the terminal carrier and the insert are molded with the insert being aligned for mating with the terminal carrier whereby the terminal carrier is configured to be pressed straight into the insert in a loading direction, the bridge being broken during loading of the terminal carrier into the insert.

18. The power connector of claim 16, wherein the bridge includes a first bridge member along the first side of the insert at the bottom of the insert and a second bridge member along the second side of the insert at the bottom of the insert.

19. The power connector of claim 16, wherein the carrier openings have a first length, the insert openings having a second length approximately equal to the first length.

20. A power connector comprising:

a housing including a terminal carrier and an insert matable to the terminal carrier to define the housing;

the terminal carrier including terminal channels at a mating end of the terminal carrier configured to be mated to a header connector, the terminal carrier including high voltage interlock (HVIL) contact channels, the terminal carrier including a pocket aligned with the HVIL contact channels;

the insert coupled to the terminal carrier at the pocket, the insert configured to be received in the pocket, the insert including HVIL contact channels, wherein the terminal carrier and the insert are molded as a single piece with a bridge connecting the terminal carrier and the insert, the bridge configured to be breakable prior to or during assembly to allow loading of the insert into the pocket to a loaded position, the HVIL contact channels of the insert being aligned with the HVIL contact channels of the terminal carrier in the loaded position;

power terminals received in the terminal channels of the terminal carrier, the power terminals configured to be coupled to header power terminals of the header connector to form a power circuit; and HVIL contacts received in the HVIL contact channels of the terminal carrier and the insert, the HVIL contacts configured to be mated with header HVIL contacts of the header connector to form a HVIL circuit, the HVIL circuit controlling the power circuit.

* * * * *